3,021,295
PROCESS FOR REMOVING HAZINESS FROM AN AQUEOUS SOLUTION OF A BLEND OF POLYMERS
Robert Saxon, Stamford, and Tzeng J. Suen, New Canaan, Conn., assignors to American Cyanamid Company, New York, N.Y., a corporation of Maine
No Drawing. Filed Mar. 16, 1960, Ser. No. 15,281
8 Claims. (Cl. 260—29.4)

This invention relates to a process for removing haze from certain hazy aqueous resinous solutions comprising passing a gas, that is substantially inert to the constituents in said solution, through said solution until the haze has been substantially completely dissipated. A more detailed discussion of the type of resinous solutions to be treated and the mode of treating the same will be set forth herinbelow.

One of the objects of the present invention is to clarify hazy solutions of certain resinous materials to a substantially water-white condition by passing a gas therethrough, which gas is substantially inert to the constituents in said solution until the haziness has been substantially completely dissipated. A further object of the present invention is to convert a less readily saleable resinous solution to a readily saleable condition by the process of the present invention. These and other objects of the present invention will be discussed in greater detail hereinbelow.

The resinous solutions that are treated in accordance with the concept of the present invention are those disclosed in the U.S. Patent 2,906,724, issued September 29, 1959, to John H. Daniel, Jr. The resinous solutions disclosed and claimed in the above-mentioned patent are ordinarily water-white and crystal clear. However, occasionally in the blending of one of the components of the composition with the other a persistent haziness develops. The reason for the haziness developed is not immediately known and is rather spasmodic. The fact remains however that in certain instances the blending of the components results in a solution which has a definite haze which also is not capable of being removed by conventionally known techniques such as filtration. It is further suspected that the haziness which develops occasionally in these resinous solutions on the blending of the components is not due to an impurity but rather perhaps to some imperfection in the blending technique. Basis for believing this latter premise is the fact that when the process of the present invention is practiced, certain small quantities of materials are removed from these resin solutions with the gas that passes through the solution. When these small quantities of materials are entrapped, they can be returned to the solution and redispersed therein without recreating the haziness once existing and now gone. Although certain theories have been advanced in an endeavor to explain this spasmodic but persistent haziness that occasionally develops, none have been clearly established as factual. It has been suggested that the haze may be due to a persistent "immiscibility" by the two or more liquids in the system which is converted to "miscibility" by the process of the present invention.

In the practice of the process of the present invention a gas is passed through these aqueous resinous solutions in a sufficient quantity and for a sufficient period of time in order to remove the existing haziness from the solution. The gas which is used should be substantially inert to the constituents in the resinous solution.

Among the gases which may be used are air, nitrogen, oxygen, hydrogen and the like. Inert organic gases such as methane, ethane and propane could be used if desired. However, from a cost standpoint, air is the most desirable gas to be used and is thus recommended.

In the practice of the process of the present invention one may pass the inert gas through the resinous solution at a temperature varying between about 0° C. and the reflux temperature, e.g., 110° C. Preferably one should use a temperature varying between about room temperature, e.g., 25° C. and 80° C.

It is preferred to carry out the process of the present invention under atmospheric pressure conditions although subatmospheric and superatmospheric pressure conditions could be used.

No adjustment of pH is necessary during the practice of the process of the present invention and although some quantities of ammonia or ammonium hydroxide may be removed during the process thus possibly varying the pH slightly, this alteration of pH is inadvertent and not deemed to be critical.

During the practice of the process of the present invention the resinous solution with the gas bubbling therethrough will be under some measure of agitation due to the gas passing through the solution. Further agitation of the resinous solution by an alternative additional mechanical means is therefore not necessary. However, it is preferred for more speedy results to make use of an agitation means over and beyond the agitation provided by the bubbling gas. The location of the gas inlet tube is not critical but rather a matter of choice. One could introduce the gas through the inlet tube in a position immediately below the mechanical agitator although it is also known to be possible to introduce the gas at a point just below the surface of the liquid with completely desirable results with the aid of the additional agitating means.

The flow rate of the gas and the length of time of flow are interdependent upon one another and are also interdependent upon the degree of haziness in the resinous solution. The slower the gas flow rate the longer the time required for the removal of the haze from the resinous solution. The faster the gas flow rate the shorter the time required based on solutions of substantially identical haziness. The less hazy resinous solutions take less time to clarify than the more hazy resinous solutions.

One skilled in the art equipped with this information can readily adjust his flow rate and flow time to convert the hazy resinous solution to a clear one.

Reference is again made to the U.S. Patent 2,906,724 for the purpose of incorporating herein all of the disclosures contained in said cited patent. It is desired however to incorporate certain parts of said disclosure herein physically in order to illustrate in the present application more fully the concept of the present invention.

In the preparation of the water-soluble copolymers used in the composition of the present invention, one of the essential reactants is an alpha, beta-ethylenically unsaturated carboxylic acid. This class of acids includes not only the monocarboxylic acids but includes as well the polycarboxylic acids. Amongst the monocarboxylic acids which may be used to prepare the copolymers of the present invention are such acids as acrylic, beta-benzoyl acrylic, methacrylic, cinnamic, crotonic and the like. Amongst the alpha, beta- unsaturated polycarboxylic acids which may be used in the preparation of the copolymers used in the present invention are the maleic, fumaric, itaconic, citraconic, mesaconic, aconitic; and the halogenated acids such as halogenated maleic, chloromaleic acid and the like. Quite obviously, these acids may be used either singly or in combination with one another. Whenever available, anhydrides of these acids may be used either singly or in combination with one another or with the acids.

As a second essential component to the water-soluble copolymers used in the present invention, there are the alkyl esters of the alpha, beta-unsaturated monocarboxylic acids such as methyl acrylate, ethyl acrylate, propyl acrylate, butyl acrylate, octyl acrylate, decyl acrylate, lauryl acrylate, ethyl methacrylate, butyl methacrylate, heptyl methacrylate, decyl methacrylate, propyl crotonate, butyl crotonate, nonoyl crotonate, and the like. These alkyl esters may be used either singly or in combination with one another.

There are certain other polymerizable vinylidene monomers such as those containing the polymerizable $CH_2=C<$ groups which may be used to advantage with the alpha, beta unsaturated carboxylic acids and the alkyl esters of the alpha, beta-ethylenically unsaturated monocarboxylic acids. Included in such groups are such polymerizable vinyl compounds as styrene, ortho-, meta- or para-alkyl styrenes such as the o-, m- or p-methyl, ethyl, propyl and butyl styrenes, 2,4-dimethyl styrene, 2,3-dimethyl styrene, 2,5-dimethyl styrene, vinyl naphthalene acrylonitrile, methacrylonitrile, halo ring or side chain styrenes such as α-chloro styrene, ortho-, meta- or para-chloro styrenes, 2,4-dichloro styrene, 2,3-dichloro styrene, 2,5-dichloro styrene or the alkyl side chain styrenes such as α-methyl styrene, α-ethyl styrene and the like. Additionally, one may make use of such polymerizable vinyl monomers as acrylamide, methacrylamide, ethacrylamide, ethylenebisacrylamide, N-tertiarybutylacrylamide and the like. These additional monomers may be used either singly or in combination with one another or may be left out of the composition entirely. The amount of monomer of diminished water solubility will vary considerably and directly in amount with the available hydrophilic groups in the polymer. When 50% of acrylic acid is used in the polymer, larger amounts of a monomer such as styrene may be used whereas when 5% of acrylic acid is used, little or no styrene should be used. As a result of this limitation, it is generally advisable to use not more than 25% by weight of these polymerizable monomers in the total weight of the ultimate copolymer comprising the ethylenically unsaturated acid and the alkyl ester of the ethylenically unsaturated monocarboxylic acid.

The copolymers used in the present invention are rendered water-soluble by reaction with ammonium hydroxide to form the ammonium salt of the copolymer. The amount of ammonium hydroxide used to produce the water-soluble salt of the copolymer may be varied over a fairly wide range. For instance, one may use a sufficient amount of ammonium hydroxide to form the half salt by using ½ mol equivalent of ammonium hydroxide per mol of carboxyl groups available in the copolymer as produced. One may furthermore use a full equivalent of ammonium hydroxide per mol equivalent of carboxyl group present in the copolymer as prepared. Still further, one could use an excess of ammonium hydroxide to insure complete salt formation in amounts up to and even exceeding 4 mol equivalents of ammonium hydroxide per mol of carboxyl group present in the copolymer.

As the second principal component of the composition mixture of the present invention, one will use the water-soluble potentially thermosetting polymethyl ethers of polymethylol melamines. The polymethyl ether will encompass the dimethyl ether, the trimethyl ether, the tetramethyl ether, the pentamethyl ether and the hexamethyl ether of polymethylol melamines. In preparing the polymethylol melamines, one must react at least 2 mols of formaldehyde and preferably at least 3 mols of formaldehyde with each mol of melamine under known reaction conditions in order to produce the water-soluble polymethylol melamine such as trimethylol melamine and the like. The preferred methyl ether of polymethylol melamine is the hexamethoxyhexamethylol melamine. The ratio of the water-soluble potentially thermosetting polymethyl ether of polymethylol melamine to the water-soluble ammonium salt of the copolymer may be varied over a fairly wide range. For instance, one may use between about 10% to about 50% by weight of the methylol melamine material to a corresponding 90%–50% by weight of the water-soluble copolymer.

The water-soluble copolymers used in the composition of the present invention may be prepared by reacting alkyl esters of alpha, beta unsaturated monocarboxylic acids and alpha, beta unsaturated carboxylic acids in proportions which vary over a fairly wide range. For instance, one may use between about 50% and 95% by weight of the alkyl esters of the alpha, beta unsaturated monocarboxylic acids to a corresponding 50%–5% by weight of the alpha, beta unsaturated carboxylic acids. Preferably, one would use about 75–90% by weight of the alkyl ester of the alpha, beta ethylenically unsaturated monocarboxylic acid to about 25–10% by weight of the alpha, beta ethylenically unsaturated carboxylic acid. If a third component of the class described hereinabove is to be utilized in the preparation of these water-soluble copolymers, it may be present in an amount up to about 25% by weight based on the total weight of the copolymer solids.

In the use of these mixtures of the thermo setting resin-forming reaction products with the water-soluble copolymers of the present invention, it is not imperative that a catalyst be used, although one may be used as a matter of choice. The catalyst used may be any of the conventional catalytic materials, many of which have been disclosed in the prior art and which are water soluble or at least water dispersible. The amount of catalyst which may be used obviously can be varied over a considerable range, as the prior art clearly teaches.

The compositions of the present invention have a considerable number of advantages over the prior art compositions, particularly when these compositions are being used as coating compositions. In addition to the already mentioned advantage of not presenting a fire hazard threat, the compositions of the present invention are of very low toxicity as the solvent, being water, is far more desirable than the toxic solvents such as xylol and even the less toxic organic solvents such as mineral spirits. Additionally, the compositions of the present invention can be prepared far less expensively than their organic solvent equivalents and thus make the compositions of the present invention more desirable because they are far cheaper.

In order that the concept of the present invention may be more fully and completely understood, the following examples are set forth in which all parts are parts by weight unless otherwise indicated. These examples are set forth primarily for the purpose of illustration and specific enumeration of detail contained therein should not be interpreted as a limitation on the case except as is indicated in the appended claims.

COPOLYMER SOLUTION A

Into a suitable reaction vessel equipped with stirrer, thermometer and reflux condenser, there is introduced 97.4 parts of dioxane and the charge is heated to reflux. A monomer mixture of 756 parts of butyl acrylate and 127.2 parts of acrylic acid together with 3.54 parts of n-butyl mercaptan is added gradually at a uniform rate over a period of 4 hours. During this addition of the monomer mixture, there is added separately, in small increments, 17.7 parts of ditertiary butyl peroxide. When the addition of the monomer mixture and the catalyst is completed, the charge is maintained at the reflux temperature with constant stirring for about 3 additional hours. The resulting viscous copolymer is cooled to about 90° C. and there is then added gradually, with constant stirring, a dilute aqueous solution of ammonia prepared by adding 211 parts of concentrated ammonium hydroxide (29% $NH_3$) to 948 parts of water.

RESINOUS COMPOSITION I

When the copolymer solution A is completely uniformly dissolved, 467 parts of the hexamethyl ether of hexamethylol melamine and 9.3 parts of p-toluene sulfonic acid monohydrate are added and thoroughly mixed. The resulting composition is found to be a turbid hazy solution.

Example 1

The hazy resinous solution I is charged to a vessel equipped with stirrer, thermometer, reflux condenser and gas inlet and outlet tubes. The inlet tube is adjusted so as to be below the surface of the resinous solution in the vessel. The charge is heated to and maintained at about 70° C. with constant agitation. Sparging of the solution is begun using air as the inert gas. The flow rate of the air, measured in a flowmeter at 25° C., is 0.01 cu. ft./min./lb. of liquid. After a period of 4½ hours the resinous solution has clarified to a water clear, sparkling resin solution. On cooling the solution down below room temperature, i.e., 15° C., the haziness and turbidity originally present does not reappear.

Example 2

Example 2 is repeated in all details except that the flow rate of the air measured in a flowmeter at 25° C. is 0.005 cu. ft./min./lb. of liquid. Ten hours of this sparging was required to produce the clarity desired. The water-white appearance of the resinous solution persists even when the resin solution is cooled to 15° C.

Example 3

Example 2 is repeated in all details except that in the place of air, nitrogen is substituted and the flow rate is 0.05 cu. ft./min./lb. of liquid. The mixture clarified in a little over 3 hours.

We claim:

1. A process for removing haziness from a hazy, aqueous resinous solution comprising passing a gas, that is substantially inert to the constituents in said solution, through said solution at a temperature between about 0° C. and reflux until the haze has been substantially completely dissipated, wherein said resinous solution is a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of an ethylenically unsaturated carboxylic acid and (b) 50% to 95% by weight of an alkyl ester of an alpha, beta-ethylenically unsaturated monocarboxylic acid.

2. A process for removing haziness from a hazy, aqueous resinous solution comprising passing a gas, that is substantially inert to the constituents in said solution, through said solution at a temperature between about 25° C. and 80° C. until the haze has been substantially completely dissipated, wherein said resinous solution is a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of an ethylenically unsaturated carboxylic acid and (b) 50% to 95% by weight of an alkyl ester of an alpha, beta-ethylenically unsaturated monocarboxylic acid.

3. A process for removing haziness from a hazy, aqueous resinous solution comprising passing air through said solution, at a temperature between about 0° C. and reflux until the haze has been substantially completely dissipated, wherein said resinous solution is a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of an ethylenically unsaturated carboxylic acid and (b) 50% to 95% by weight of an alkyl ester of an alpha, beta-ethylenically unsaturated monocarboxylic acid.

4. A process for removing haziness from a hazy, aqueous resinous solution comprising passing nitrogen through said solution, at a temperature between about 0° C. and reflux until the haze has been substantially completely dissipated, wherein said resinous solution is a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of an ethylenically unsaturated carboxylic acid and (b) 50% to 95% by weight of an alkyl ester of an alpha, beta-ethylenically unsaturated monocarboxylic acid.

5. A process for removing haziness from a hazy, aqueous resinous solution comprising passing a gas, that is substantially inert to the constituents in said solution, through said solution at a temperature between about 0° C. and reflux until the haze has been substantially completely dissipated, wherein said resinous solution is a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of acrylic acid and (b) 50% to 90% by weight of butyl acrylate.

6. A process for removing haziness from a hazy, aqueous resinous solution comprising passing a gas, that is substantially inert to the constituents in said solution, through said solution at a temperature between about 0° C. and reflux until the haze has been substantially completely dissipated, wherein said resinous solution is a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of methacrylic acid and (b) 50% to 90% by weight of butyl acrylate.

7. A process for removing haziness from a hazy, aqueous resinuous solution comprising passing a gas, that is substantially inert to the constituents in said solution, through said solution at a temperature between about 0° C. and reflux until the haze has been substantially completely dissipated, wherein said resinous solution is a mixture of (1) 50% to 10% by weight of the hexamethyl ether of hexamethylol melamine and (2) 50% to 90% by weight of a water-soluble ammonium salt of a copolymer comprising (a) 5% to 50% by weight of acrylic acid and (b) 50% to 90% by weight of butyl acrylate.

8. A process for removing haziness from a hazy, aqueous resinous solution comprising passing a gas, that is substantially inert to the constituents in said solution, through said solution at a temperature between about 0° C. and reflux until the haze has been substantially completely dissipated, wherein said resinous solution is a mixture of (1) 50% to 10% by weight of the hexamethyl ether of hexamethylol melamine and (2) 50% to 90% by weight of a water-soluble ammonium salt of a copolymer comprising (a) 5% to 50% by weight of methacrylic acid and (b) 50% to 90% by weight of butyl acrylate.

References Cited in the file of this patent

UNITED STATES PATENTS 2,906,724   Daniel _____ Sept. 29, 1959